(12) United States Patent  
Lee

(10) Patent No.: US 8,007,117 B2  
(45) Date of Patent: Aug. 30, 2011

(54) ASSEMBLING MECHANISM

(75) Inventor: Sea-Huang Lee, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 330 days.

(21) Appl. No.: 12/464,116

(22) Filed: May 12, 2009

(65) Prior Publication Data

US 2010/0071199 A1 Mar. 25, 2010

(30) Foreign Application Priority Data

Sep. 23, 2008 (TW) .............................. 97136532 A

(51) Int. Cl.
*H05K 13/04* (2006.01)
*G03B 21/14* (2006.01)

(52) U.S. Cl. ........ 353/101; 353/119; 359/811; 359/824; 359/827

(58) Field of Classification Search .................. 353/100, 353/101, 119; 359/811, 812, 822, 823, 824, 359/825, 827, 830

See application file for complete search history.

(56) References Cited

U.S. PATENT DOCUMENTS

| 7,035,535 B2* | 4/2006 | Nomura ........................... 396/73 |
| 7,044,749 B2* | 5/2006 | Rogers et al. ..................... 439/74 |
| 7,903,357 B2* | 3/2011 | Ho ................................. 359/828 |
| 2004/0042095 A1* | 3/2004 | Nomura ......................... 359/822 |
| 2004/0051981 A1* | 3/2004 | Nomura ......................... 359/822 |
| 2007/0008506 A1* | 1/2007 | Meng et al. .................... 353/119 |
| 2010/0046102 A1* | 2/2010 | Ho ................................. 359/828 |
| 2010/0214678 A1* | 8/2010 | Hino et al. ..................... 359/823 |

* cited by examiner

*Primary Examiner* — William C Dowling  
(74) *Attorney, Agent, or Firm* — Jianq Chyun IP Office

(57) ABSTRACT

An assembling mechanism for assembling a lens module of a projector to an optical engine base of the projector includes a supporting stage fixed to the optical engine base, a supporting flange fixed to the lens module, a first fastener fixed to the optical engine base, a second fastener selectively engaged with the first fastener and disposed on the lens module around an axis, a first electrical connector fixed to the optical engine base, and a second electrical connector selectively coupled with the first electrical connector and disposed on the lens module. When the supporting flange contacts against the supporting stage and then the second fastener is engaged with the first fastener, the displacement of the supporting flange along the axis and the rotation of the supporting flange about the axis relative to the supporting stage are limited, and the first electrical connector is coupled with the second electrical connector.

9 Claims, 6 Drawing Sheets

ASSEMBLING MECHANISM

CROSS-REFERENCE TO RELATED APPLICATION

This application claims the priority benefit of Taiwan application serial no. 97136532, filed on Sep. 23, 2008. The entirety of the above-mentioned patent application is hereby incorporated by reference herein and made a part of this specification.

BACKGROUND OF THE INVENTION

1. Field of the Invention

The present invention relates to an assembling mechanism, and in particular, to an assembling mechanism for assembling or disassembling a lens module of a projector rapidly.

2. Description of Related Art

As the projection display technology is advanced and the manufacturing cost is lowered, a projector has become a consumer electronic product. The operation principle of the projector is transforming the light emitted by the light source into the image light beam, then projecting the image light beam through the lens module on the reflection screen to form an image.

FIGS. 1 and 2 illustrate a conventional lens module and optical engine base before and after assembled respectively. Referring to FIGS. 1 and 2, a plurality of screws 104 are usually utilized to fasten the lens module 102 of a projector on the optical engine base 106 directly. Therefore, when replacing the lens module 102, it is necessary to use tools to unscrew the screws 104, and then the lens module 102 can be disassembled from the optical engine base 106.

Moreover, it is required to have an experienced person to manually connect a conductive wire connector of a motor 108 disposed on the lens module 102 to a particular connector on a main board of the projector, so that the motor 108 of the lens module 102 can provide torque under the control of the main board. Therefore, it is troublesome to perform assembly and disassembly between the lens module 102 and the optical engine base 106.

SUMMARY OF THE INVENTION

The present invention provides an assembling mechanism for assembling and disassembling a lens module of a projector rapidly.

According to one embodiment of the invention, an assembling mechanism for assembling a lens module of a projector to an optical engine base is provided. The assembling mechanism includes a supporting stage, a supporting flange, at least one first fastener, at least one second fastener, a first electrical connector, and a second electrical connector. The supporting stage is adapted to being fixed to the optical engine base, and the supporting flange is adapted to being fixed to the lens module. The first fastener is adapted to being fixed to the optical engine base while the second fastener is selectively coupled with the first fastener and adapted to being disposed on the lens module around an axis.

The first electrical connector is fixed to the optical engine base, and the second electrical connector is selectively coupled with the first electrical connector and adapted to being disposed on the lens module. When the supporting flange is against the supporting stage, and then the second fastener rotates relatively to the first fastener about the axis and is engaged with the first fastener, the displacement of the supporting flange along the axis and the rotation of the supporting flange about the axis relative to the supporting stage are limited, and the first electrical connector is coupled with the second electrical connector.

According to one embodiment of the invention, the first fastener is a lock hook, and the second fastener is a lock piece.

According to one embodiment of the invention, the assembling mechanism further includes a slide ring disposed on the lens module around the axis, and the second fastener is fixed to the slide ring.

According to one embodiment of the invention, the second electrical connector is fixed to the slide ring.

According to one embodiment of the invention, the assembling mechanism further includes a fixed ring and at least one fastener, wherein the slide ring has at least one slot. The fastener passes through the slot to secure the fixed ring to the supporting flange, so that the fastener in association with the slot limits a rotating range of the slide ring relative to the supporting flange.

According to one embodiment of the invention, the fastener is a shoulder screw.

According to one embodiment of the invention, the assembling mechanism further includes a handle fixed to the slide ring.

According to one embodiment of the invention, the assembling mechanism further includes a handle fixed to the lens module.

According to the one embodiment of the invention, the first electrical connector is a circuit board having a plurality of pads, and the second electrical connector is a probe connector.

According to the aforesaid embodiments of the invention, the lens module of the projector may be assembled or disassembled from the optical engine base without using any tools, and thereby the assembly or the replacement of the lens module is convenient.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the embodiment of the invention, and are incorporated in and constitute a part of this specification. The drawings illustrate embodiments of the invention and, together with the description, serve to explain the principles of the invention.

DESCRIPTION OF EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
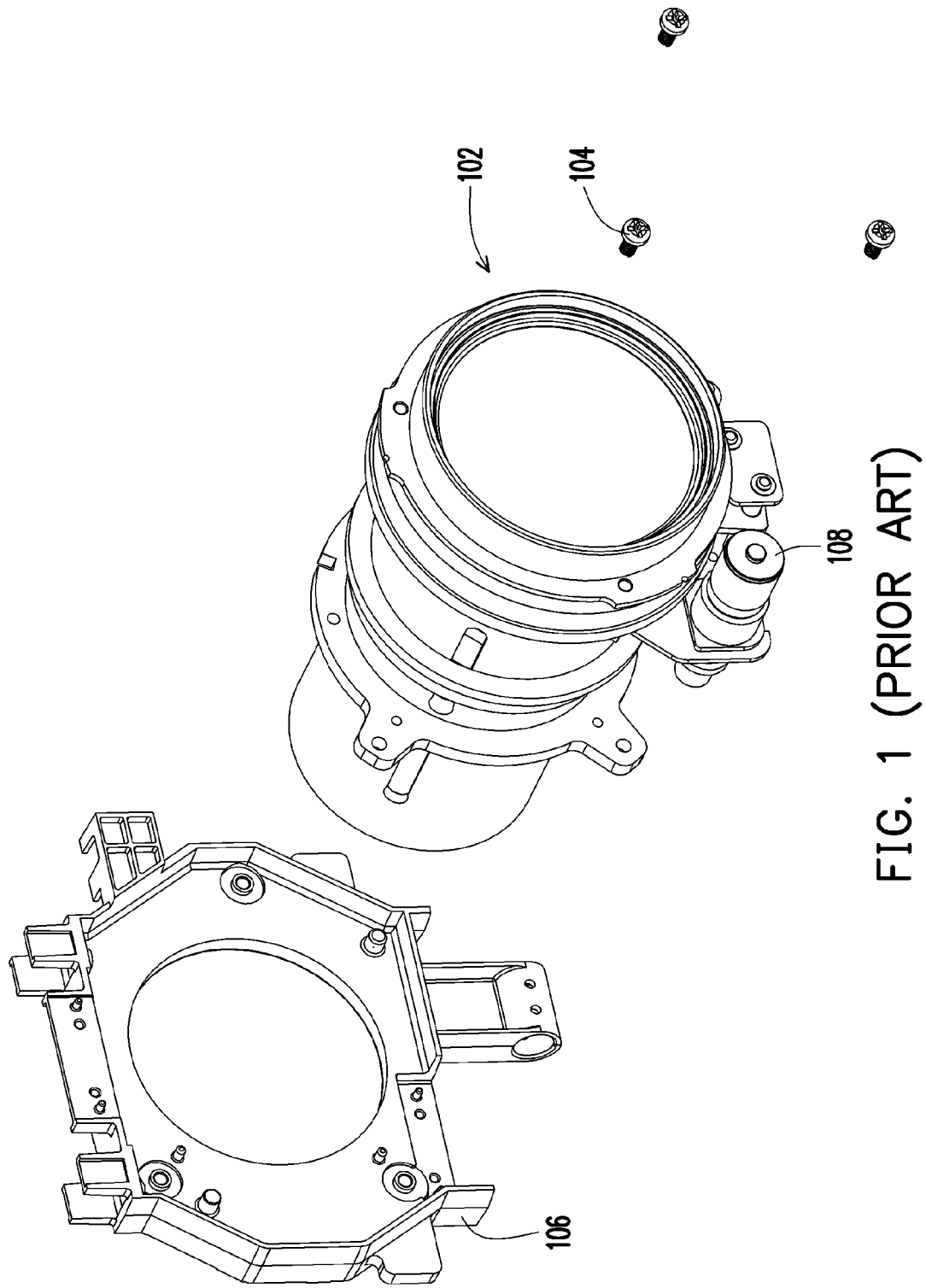
FIG. 1 is a perspective view illustrating a lens module and an optical engine base before assembled.
Figure 2:
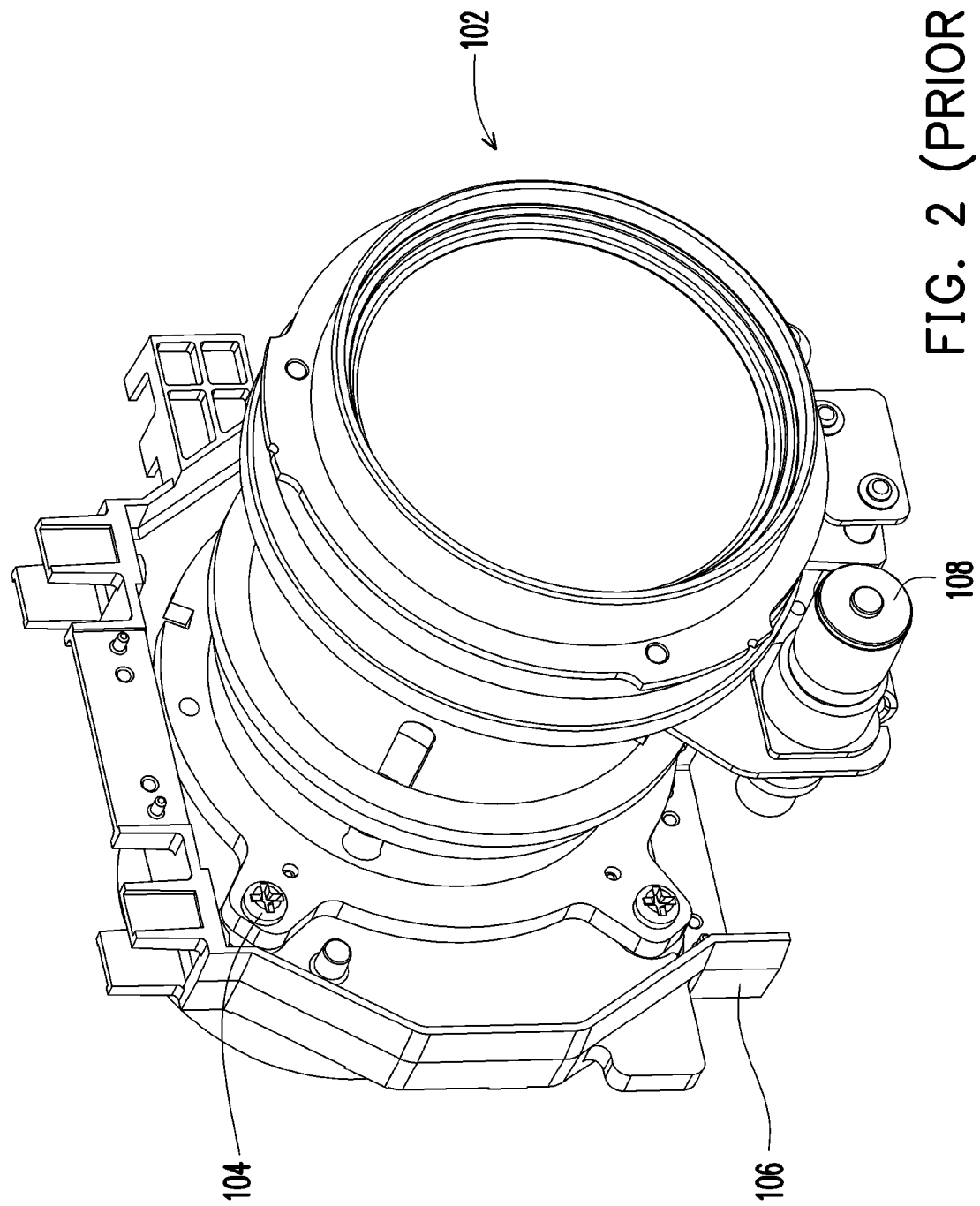
FIG. 2 is a perspective view illustrating the lens module and the optical engine base after assembled.
Figure 3:
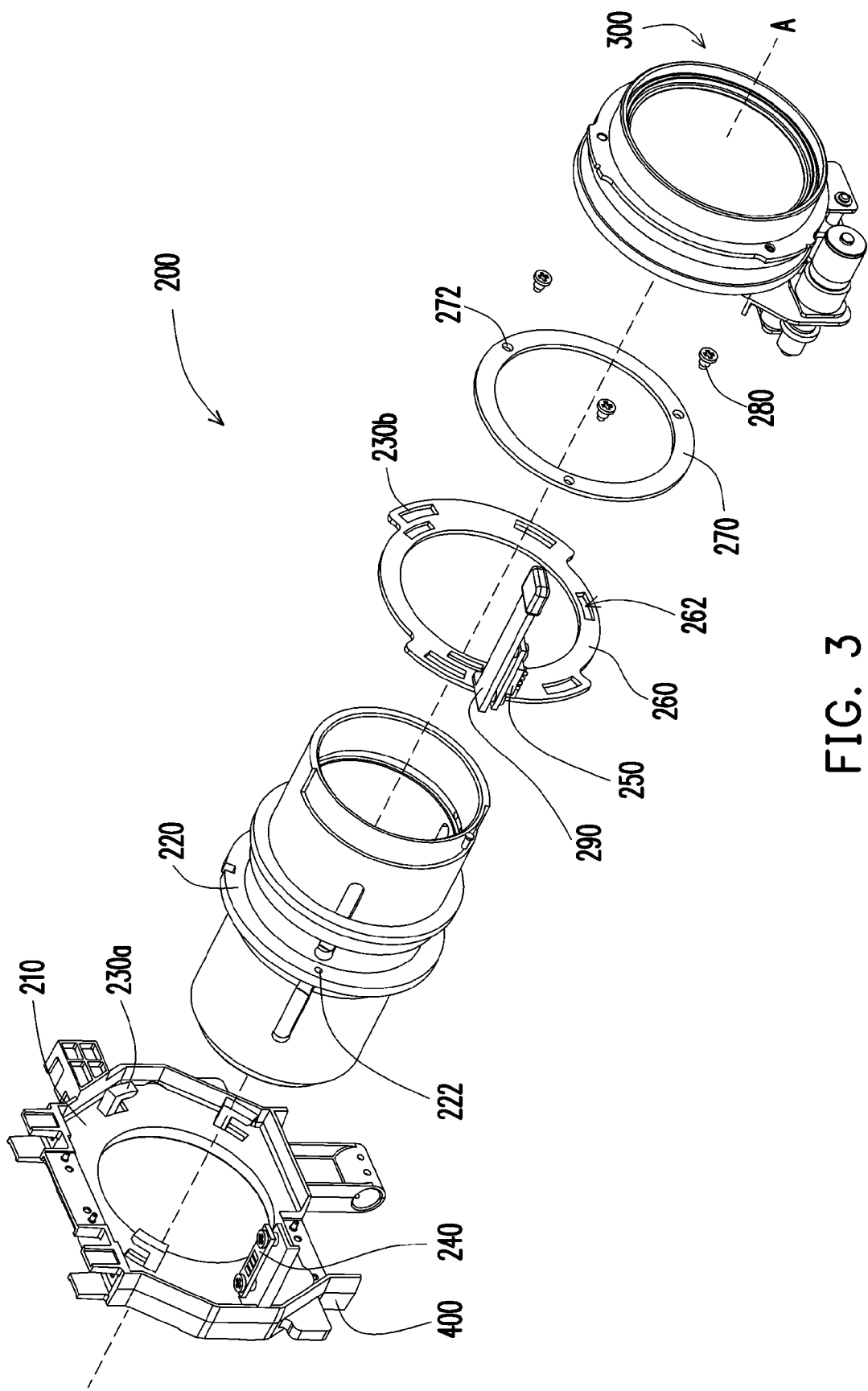
FIG. 3 is an exploded view illustrating how the lens module is assembled to the optical engine base according to one embodiment of the invention.
Figure 4A:
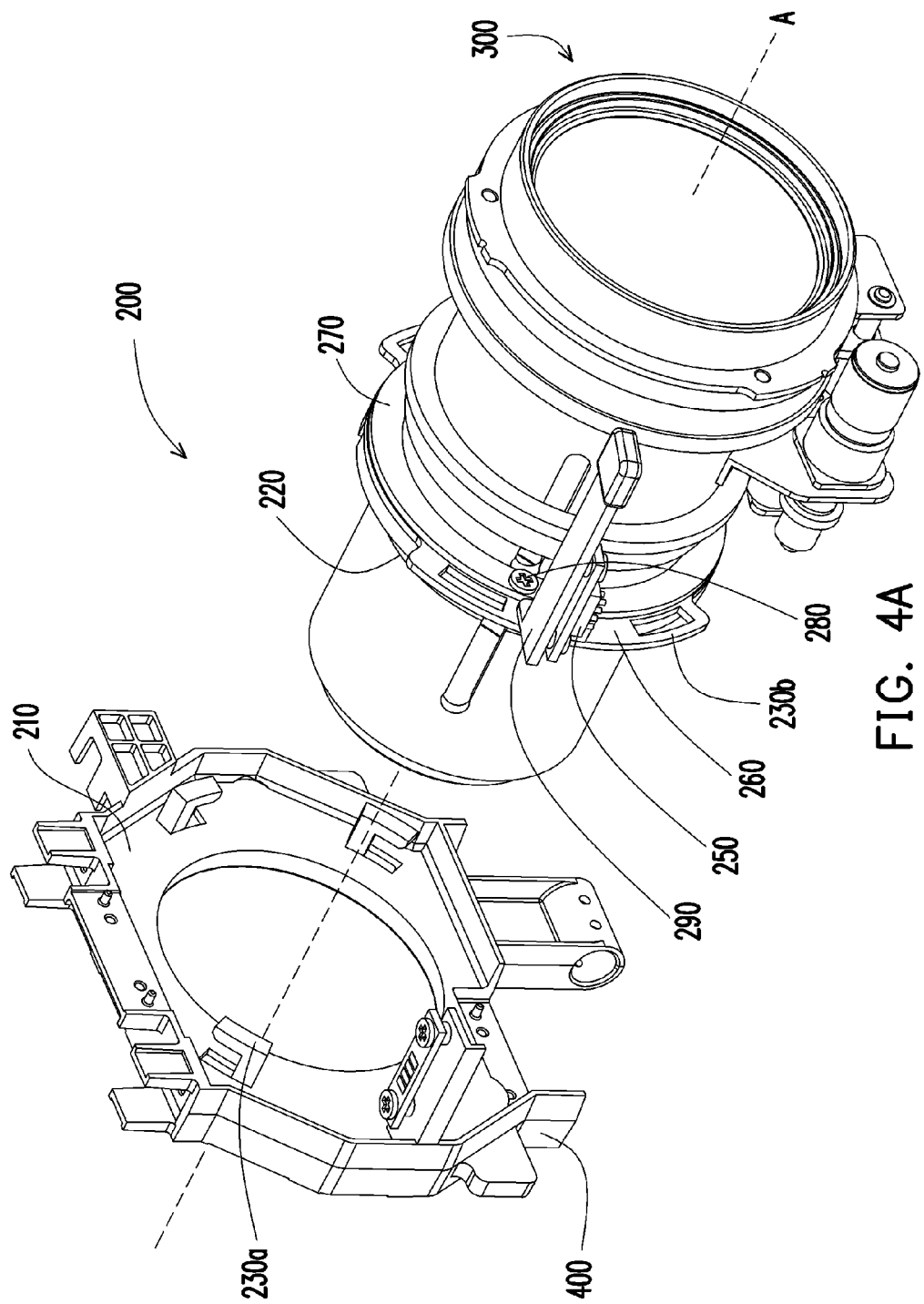
FIGS. 4A-4C illustrate the process of assembling the lens module to the optical engine base by using the assembling mechanism as shown in FIG. 3.
Figure 4B:
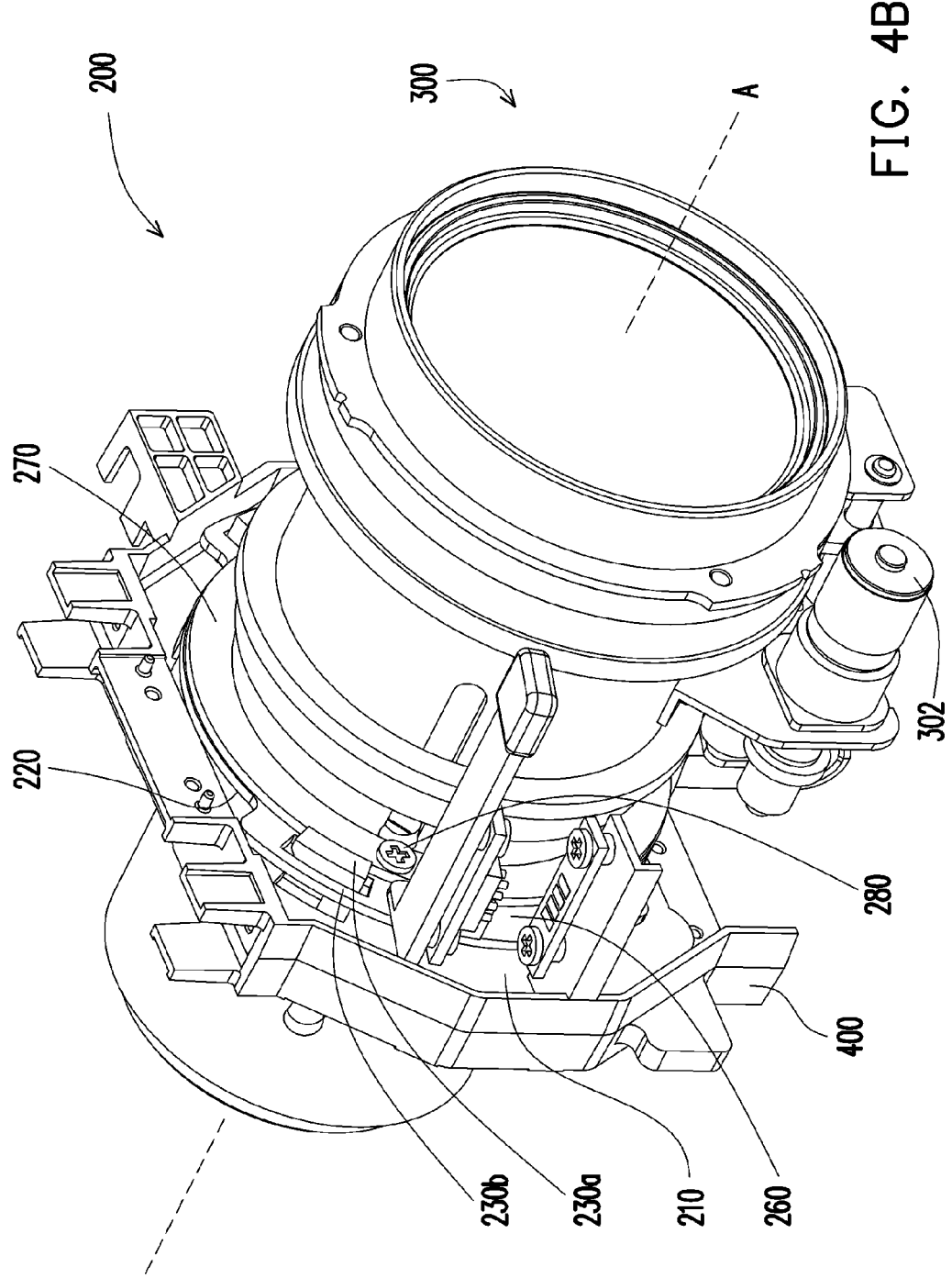
Figure 4C:
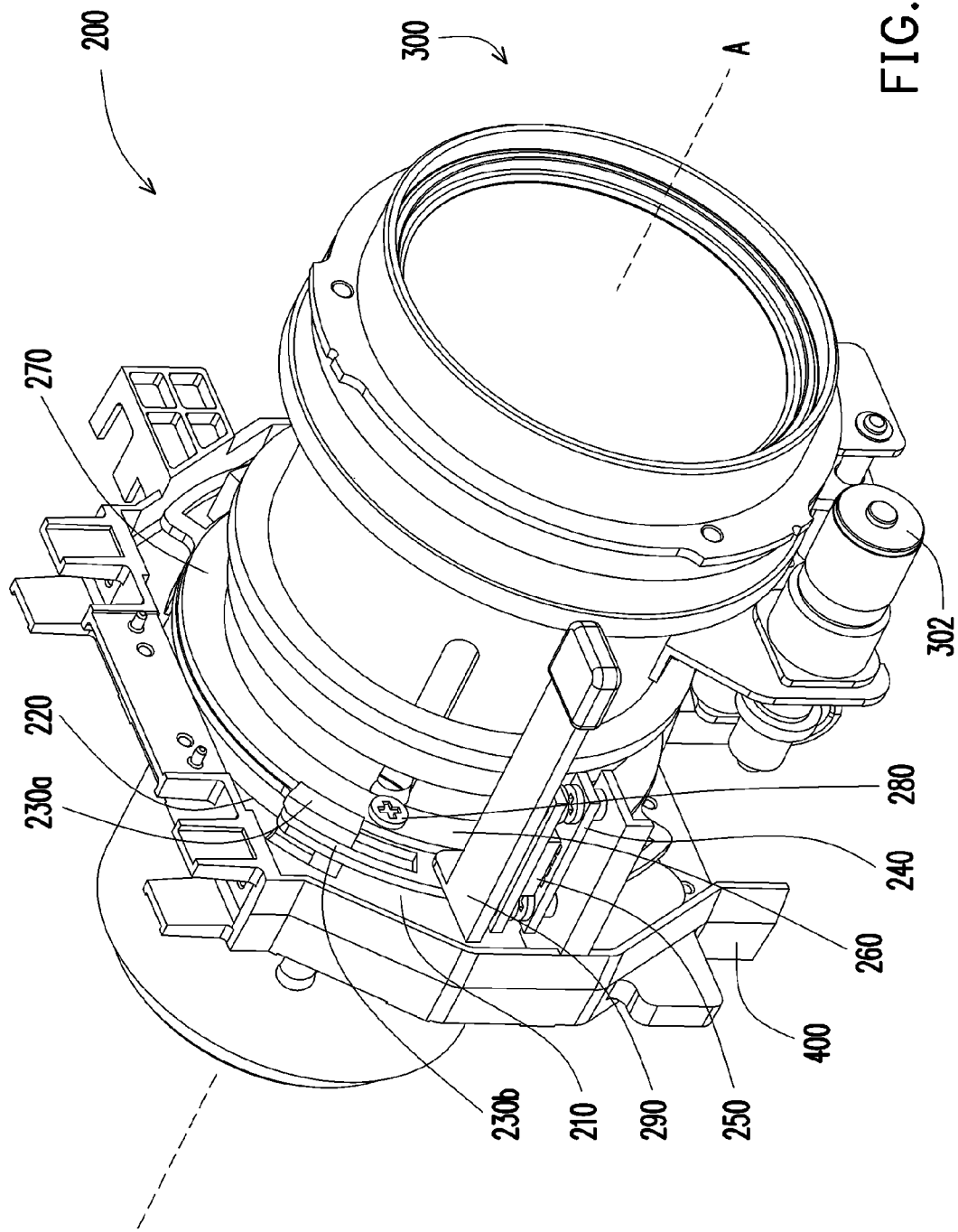

FIG. 3 is an exploded view illustrating an assembling mechanism used for assembling a lens module to an optical engine base according to one embodiment of the invention. FIGS. 4A-4C illustrate the process of assembling the lens module to the optical engine base by using the assembling mechanism as shown in FIG. 3.

Referring to FIGS. 3 and 4A, by using an assembling mechanism 200, a lens module 300 of a projector may be assembled to or disassembled from an optical engine base 400 of a projector according to one embodiment of the invention. The assembling mechanism 200 includes a supporting stage 210 adapted to being fixed to the optical engine base 400, a supporting flange 220 adapted to being fixed to the lens module 300, a plurality of first fasteners 230a (herein, only three first fasteners 230a are shown by FIG. 3), a plurality of second fasteners 230b, a first electrical connector 240 fixed to the optical engine base 400, and a second electrical connector 250 selectively coupled with the first electrical connector 240 and adapted to being disposed on the lens module 300.

The first fasteners 230a are adapted to being fixed to the optical engine base 400 and distributed on the supporting stage 210 symmetrically around an axis A. The second fasteners 230b are disposed on the lens module 300 around the axis A. The second fasteners 230b are arranged corresponding to the first fasteners 230a, and engaged with the first fasteners 230a respectively. Therefore, by using the structural design between the first fasteners 230a and the second fasteners 230b, the lens module 300 may be indirectly fixed on the optical engine base 400. According to the embodiment of the invention, the first fastener 230a is, for example, a lock hook, and the second fastener 230b is, for example, a lock piece. Furthermore, the first fasteners 230a and the supporting stage 210 may be manufactured as an integral unit.

Referring to FIGS. 3 and 4A, the assembly mechanism 200 may further include a slide ring 260, a fixed ring 270, and a plurality of fasteners 280. The slide ring 260 may include a plurality of slots 262, and the fixed ring 270 may correspondingly have a plurality of through holes 272, and the supporting flange 220 may correspondingly have a plurality of threaded holes 222. The fasteners 280 are, for example, shoulder screws.

The fasteners 280 may pass through the through holes 272 and the slots 262 in order, and the fasteners 280 are screwed to the threaded holes 222 of the supporting flange 220, so that the slide ring 260 is disposed on the lens module 300, and the slide ring 260 is rotated around the axis A relatively to the lens module 300. Furthermore, based on the association between the fasteners 280 and the slots 262, the rotation range of the slide ring 260 relative to the supporting flange 220 is limited.

Through the association between the slots 262 and the fasteners 280, the slide ring 260 may rotate relatively to the lens module 300 about the axis A within an appropriate rotation range, so that the slide ring 260 may rotate relatively to the supporting stage 210 without driving the lens module 300. Therefore, the operation is more effort-saving for a user.

According to another embodiment not shown, the assembling mechanism 200 may include one fastener 280 only, the slide ring 260 may include only one slot 262 correspondingly, the fixed ring 270 may include only one through hole 272 correspondingly, and the supporting flange 220 may include only one threaded hole 222 correspondingly.

According to the embodiment of the invention, the assembling mechanism 200 may further include a handle 290 which may be fixed to the slide ring 260 or the lens module 300. According to the embodiment of the invention, the second electrical connector 250 may be fixed to the handle 290 disposed on the slide ring 260 by the handle 290. In the other words, the second electrical connector 250 is indirectly disposed on the lens module 300. According to another embodiment not shown, the second electrical connector 250 may be fixed directly to the slide ring 260 and be indirectly disposed on the lens module 300.

Referring to FIGS. 4A-4C, the lens module 300 is shifted along the axis A toward the optical engine base 400 until the supporting flange 220 of the lens module 300 contacts against the supporting stage 210. Then, after the slide ring 260 rotates relatively to the lens module 300 about the axis A at a predetermined angle, the first fasteners 230a are respectively engaged with the second fasteners 230b, and thereby the displacement of the supporting flange 220 along the axis and the rotation of the supporting flange 220 about the axis A relative to the supporting stage 210 are limited. Meanwhile, when the slide ring 260 slides along the axis A relatively to the lens module 300, the second electrical connector 250 which slides along with the slide ring 260 is coupled with the first electrical connector 240.

In this embodiment, the first electrical connector 240 may be a circuit board having a plurality of pads, and the second electrical connector 250 may be a POGO pin connector. Therefore, the second electrical connector 250 contacts with the first electrical connector 240 electrically.

In this embodiment, the first electrical connector 240 is electrically connected with the main board (not shown) of the projector, and a motor 302 of the lens module 300 is electrically connected with the second electrical connector 250. Therefore, when the first electrical connector 240 is coupled with the second electrical connector 250, the motor 302 of the lens module 300 can be operated under the control of the main board and provide the torque.

Furthermore, if performing the steps shown by FIGS. 4A to 4C reversely, the lens module 300 may be disassembled from the optical engine base 400 by the assembling mechanism 200, and then the motor 302 is unconnected with the main board.

In summary, through the assembling mechanism according to the aforesaid embodiments of the invention, the user may assemble or disassemble the lens module of the projector without the aid of tools, and thereby the assembly or the replacement of the lens module of the projector may be performed rapidly. Furthermore, the assembling mechanism according to the aforesaid embodiments of the invention not only provide the structural connection between the lens module of the projector and the optical engine base, but also provide the electrical connection between the motor of lens module and the main board of the projector.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An assembling mechanism for assembling a lens module of a projector to an optical engine base of the projector, the assembling mechanism comprising:

a supporting stage adapted to be fixed to the optical engine base;

a supporting flange adapted to be fixed to the lens module;

at least one first fastener adapted to be fixed to the optical engine base;

at least one second fastener selectively engaged with the first fastener, and adapted to be disposed on the lens module around an axis;

a first electrical connector fixed to the optical engine base; and a second electrical connector selectively coupled with the first electrical connector and adapted to be disposed on the lens module, wherein the displacement of the supporting flange along the axis and the rotation of the supporting flange about the axis relative to the supporting stage are limited, and the first electrical connector is coupled with the second electrical connector, when the supporting flange is against the supporting stage, and then the second fastener rotates relatively to the first fastener about the axis and is engaged with the first fastener.

2. The assembling mechanism according to claim 1, wherein the first fastener is a lock hook, and the second fastener is a lock piece.

3. The assembling mechanism according to claim 1, further comprising:

a slide ring adapted to be disposed on the lens module around the axis, wherein the second fastener is fixed to the slide ring.

4. The assembling mechanism according to claim 3, wherein the second electrical connector is fixed to the slide ring.

5. The assembling mechanism according to claim 3, further comprising:

a fixed ring; and at least one fastener, wherein the slide ring has at least one slot, and the fastener passes through the slot to secure the fixed ring to the supporting flange, such that a rotation range of the slide ring relative to the supporting flange is limited due to the association between the fastener and the slot.

6. The assembling mechanism according to claim 5, wherein the fastener is a shoulder screw.

7. The assembling mechanism according to claim 3, further comprising:

a handle fixed to the slide ring.

8. The assembling mechanism according to claim 1, further comprising:

a handle fixed to the lens module.

9. The assembling mechanism according to claim 1, wherein the first electrical connector is a circuit board having a plurality of pads, and the second electrical connector is a probe connector.

* * * * *